(12) United States Patent
Hansen

(10) Patent No.: US 7,186,449 B1
(45) Date of Patent: Mar. 6, 2007

(54) RECYCLED RUBBER CONSTRUCTION MATERIALS

(76) Inventor: Thomas P Hansen, 5028 Hungry Hollow Rd., Great Valley, NY (US) 14741

( * ) Notice: Subject to any disclaimer, the term of this patent is extended or adjusted under 35 U.S.C. 154(b) by 190 days.

(21) Appl. No.: 10/708,982

(22) Filed: Apr. 5, 2004

Related U.S. Application Data

(63) Continuation-in-part of application No. 10/271,079, filed on Oct. 15, 2002, now abandoned.

(60) Provisional application No. 60/329,554, filed on Oct. 16, 2001.

(51) Int. Cl.
*B32B 1/08* (2006.01)

(52) U.S. Cl. ............... 428/36.91; 428/36.9; 428/903.3; 52/DIG. 9; 52/736.1; 52/736.2; 52/736.4; 156/95; 156/191; 156/195; 156/184; 156/185; 156/186; 156/187

(58) Field of Classification Search ............... 428/36.9, 428/36.91, 903.3; 52/DIG. 9, 736.1, 736.2, 52/736.4; 156/95, 191, 195, 184–187
See application file for complete search history.

(56) References Cited

U.S. PATENT DOCUMENTS

| | | | |
|---|---|---|---|
| 3,957,250 A * | 5/1976 | Murphy | ................ 256/19 |
| 4,022,434 A | 5/1977 | Moore | |
| 4,030,706 A | 6/1977 | Ward | |
| 4,066,244 A | 1/1978 | Yoho | |
| 4,142,821 A | 3/1979 | Doring | |
| 4,186,913 A | 2/1980 | Bruner et al. | |
| 4,312,600 A | 1/1982 | Schaaf et al. | |
| 4,477,059 A * | 10/1984 | Willis | .................. 256/65.11 |
| 5,096,772 A | 3/1992 | Snyder | |
| 5,246,754 A | 9/1993 | Miller | |
| 5,360,286 A | 11/1994 | Russell | |
| 5,472,750 A | 12/1995 | Miller | |
| 5,916,932 A | 6/1999 | Nosker et al. | |
| 5,948,827 A | 9/1999 | Lupo et al. | |
| 6,189,285 B1 * | 2/2001 | Mockry | .................. 52/720.1 |
| 6,322,863 B1 | 11/2001 | Kubicky | |
| 2002/0098318 A1 | 7/2002 | Khadem | |
| 2002/0177663 A1 | 11/2002 | Cahill | |

* cited by examiner

*Primary Examiner*—Alexander S. Thomas
(74) *Attorney, Agent, or Firm*—Simpson & Simpson, PLLC

(57) ABSTRACT

The present invention broadly comprises a construction material constructed from a plurality of flexible strips, the strips are helically wound upon one another to form a tire pole. The tire pole may incorporate bolts, nails, screws and polymers for securing the flexible strips to one another. The construction material is generally constructed from discarded tires and may comprise a utility pole, a guardrail, a signpost and may be suitable for many other construction applications.

17 Claims, 13 Drawing Sheets

RECYCLED RUBBER CONSTRUCTION MATERIALS

CROSS REFERENCE TO RELATED APPLICATION

This application is a Continuation-in-Part of U.S. patent application Ser. No. 10/271,079, filed on Oct. 15, 2002, which is now abandoned and claims benefit of U.S. Provisional Patent Application No. 60/329,554, filed on Oct. 16, 2001.

FIELD OF THE INVENTION

The present invention broadly relates to the field of resource recycling, and more particularly, to a construction material formed from recycled rubber derived from waste tires.

BACKGROUND OF THE INVENTION

Industrialized, as well as developing nations, currently face enormous solid waste disposal problems. Additionally, as technological advances lead to increased individual wealth and a greater distribution of wealth among a larger populace, more and more people are likely to increase their consumption of energy and consumer goods, in effect, increasing their production of solid waste. Methods of addressing solid waste disposal issues typically take the form of the clichéd mantra: Reduce, Reuse, Recycle. As the well known saying indicates, individuals can reduce the solid waste burden by 1.) reducing their use of goods and services, 2.) reusing products more than once before being finally disposed, or 3.) recycling old products into new products. However, while the amount of raw materials required for the manufacture of many consumer products can be reduced and some consumer products, for instance: aluminum cans, plastic bottles, paper and cardboard, are easily reused or recycled, many consumer products are not. One consumer product not easily reused or recycled that represents an enormous solid waste disposal problem is discarded automobile and truck tires.

It is estimated that over 253 million waste tires are generated throughout the United States in one year alone, which represents roughly one tire for every person. According to Waste Age Magazine, scrap tires generate 3.9 million tons or 1.9% of municipal solid waste (MSW) by weight in the United States per year. Approximately 3.2 million tons of tires are incinerated or placed in landfills each year. In New York State alone, the Department of Environmental Conservation has estimated that there are more than 100 waste tire dumpsites that contain over 27 million tires; industry suggests that the number of tires stockpiled in New York is even greater and may range between 50 and 100 million tires.

Because of its physical characteristics, the vulcanized rubber pneumatic tire has proved to be both a blessing and a curse. Tires are manufactured to be durable; they withstand extreme environments and they do not easily wear out. However, because of these same advantageous properties, there is also no real easy way to dispose of them.

Three methods for disposing tires are currently practiced; tires are incinerated, buried or stockpiled. Incineration has been so unsatisfactory that it is now illegal in most jurisdictions. Burning tires causes a horrible stench and pollutes the air with toxic fumes and particles harmful to all life forms. Even expensive modern incineration devices, complete with scrubbers for the exhaust fumes, are inferior at destroying old tires. The steel belting materials clog the incinerator while the particulate carbon and sulfur compounds tend to foul the scrubbers. Burying waste tires is not a good solution either; tires have a tendency to prematurely fill dumpsites because their hollow shapes are particularly volume consuming and they do not easily compress or nest within one another. In addition, buried tires can pose problems if the tire compresses within the landfill and then rises up later and resurfaces. Because of the problems related to their disposal by burying, forty-four states currently restrict tire disposal at landfills. Tires that are not buried represent enormous public health problems as they can be fire hazards or serve as fertile breeding areas for mosquitoes and other vectors that can harbor disease such as West Nile Virus.

The difficulty in discarding worn out tires and the energy and raw materials required to manufacture them has inspired much effort to refurbish them for further use by retreading. These efforts have spawned entire industries presently listed on the New York Stock Exchange. However, there are several major problems with producing re-treads. The new tread which is to be bonded to the old tire must be produced somewhere. Extensive amounts of energy are used to produce the heat required to bond the new tread to the old tire and, even then, that crucial bonding is not always well accomplished. In sum, there is probably as much energy used in pollution produced in the manufacture of a re-treaded tire as in the production of the original tire. Here, as with incineration, the steel belts and cords used in modern tires pose severe obstacles to the successful completion of the process. Not all tires can be effectively recycled by the retreading process. For example, if the sidewall or sealing bead is damaged the tire cannot be reclaimed. In addition, the tire must have sufficient tread and meet stringent standards of flexibility, strength, air permeability, and appearance.

Recycling old tire carcasses into other useful articles has been pursued with limited success. Some propose the shredding of old tires for use as insulation material, perhaps mixed with other insulation materials such as vermiculite. This proposal does indeed recognize the important property of extremely low thermal conductivity of tires. However, the shredding process is difficult as steel belts are imbedded in the old tires.

There have also been numerous proposals to create all kinds of decorative and ornamental articles from the tires. Examples of such uses are flower planters, landscape dividers and mulch material. Two other applications of limited but useful merit will be familiar to all. Anyone from a farm or rural community will have seen a tire hung from a rope to form the familiar "tire swing". Anyone living on or near a body of water will have seen old tires attached to the sides of docks for cushioning the impacts of boats. These particular uses of waste tires highlight the important and useful impact absorption properties of the tire material.

Numerous United States patents have been granted for various and sundry articles made from old tires. The largest group of these patents are concerned with providing highway safety dividers or barriers thus effectively utilizing the inherent impact energy absorption characteristics of the rubber. Bruner et al, U.S. Pat. No. 4,186,913, shows an arrangement of side by side upright tire casings supported in a solid rubber block which is poured around the lower portions of the tires. Bruner also mentions the possible use of this arrangement as a breakwater. Ward, U.S. Pat. No. 4,030,706, shows a highway bumper guard made from two tire casings arranged concentrically within one another and with the inner casing being filled with particulate material such as sand. Ward recognizes that this arrangement will absorb impact energy by virtue of the friction between the concentric tires. Yoho, U.S. Pat. No. 4,066,244, shows an arrangement of upright tire casing connected together in transverse lines and rows for the purpose of absorbing impact energy. Schaaf et al, U.S. Pat. No. 4,312,600, discloses a traffic barricade or marker whose base is formed from a horizontal tire casing. Schaaf recognizes that the interior portion of the tire casing may be filled with a buoyant material thus forming a buoy marker.

Other miscellaneous exploitations of used tire casings are shown by Doring, U.S. Pat. No. 4,142,821 and by Moore, U.S. Pat. No. 4,022,434. Doring shows ground stabilization devices for embankments, etc. made from variously interconnected loops of tire treads with the sidewalls removed. Moore shows a means of stacking and interconnecting upright tires to form a fence. The tire fence is supported by partially burying the lower course of tires. Moore recognizes yet another important property of the tire material, low electrical conductivity. Moore exploits this property by stringing electrified barbed wire directly from his fence without the need for expensive electrical insulator offset devices of any kind.

The many and varied previous uses for old tire casings serve to illustrate and take advantage of the important property of chemical inertness. Tire casing material will not rot, decay, decompose, deteriorate, or easily disintegrate. Tire casings are impervious to attack from mold, fungus, or bacteria, or other microorganisms. Insects, rodents, birds, bats, deer, barnacles, and other animals cannot destroy tire casings. Corrosive agents, such as salt water and most acids, do not harm tire casings. Prolonged exposure to ultra-violet radiation does not degrade tire casing material. Tire material will withstand extreme climatic temperature ranges without substantial deterioration of its excellent strength and toughness characteristics. Thus, discarded tires recycled in the form of construction materials would be particularly advantageous.

It is estimated that there are between 80 and 135 million wood utility poles in the U.S., and that four million wood poles need to be replaced annually because of routine maintenance, accidents, construction, and the woodpecker. According to the Wall Street Journal, "in a typical mid-size city, roughly 1,000 telephone poles have to be replaced every year because birds—and then rain cause them to rot."

Wood preserved utility poles represent enormous sources of toxic chemicals that are released into the environment and wood utility poles contain some of the most deadly, ubiquitous and persistent chemicals known to man. The major wood preservatives, including pentachlorophenol (penta or PCP), creosote, and arsenicals (Copper Chromium Arsenate (CCA)), are ranked among the most potent cancer agents, promoters of birth defects and reproductive problems, and nervous system toxicants. In sum, wood utility poles contain chemicals that, if used in other contexts, would be labeled hazardous waste as a result of their containing dioxin, furans and hexachlorobenzene. According to a report published by the National Coalition Against the Misuse of Pesticides (NCAMP), chemical wood preservatives account for the single largest pesticide use in the United States and perhaps the greatest pesticide threat to public health and environment with the conventional wood pole leaving a trail of poisoning and contamination from cradle to grave, beginning with the forestry practices used to grow the trees, to the production of the chemicals, to the wood treating facility, to the installation, use, storage and disposal of the treated wood.

In February 2002, the U.S. Environmental Protection Agency indicated that they had reached an agreement with representatives of the wood-preservative industry to begin phasing out the residential use of Copper Chromium Arsenate (CCA). It is estimated that this will affect about 5% of the overall toxic wood preservative market. CCA only accounts for approximately 10% of the overall market, while utility poles alone account for nearly 12% of all wood preservatives used in the United States.

In addition to comprising toxic threats, wood utility poles also represent safety threats because utility poles and signposts create serious roadside hazards for automobiles. In 1996 alone, 11,859 people died in roadside hazard crashes. Of those deaths, utility poles accounted for 9%, collisions with guardrails accounted for 9%, and collisions with signs and signposts accounted for 7% of the deaths.

Hence, in view of the fact that waste tires represent an enormous solid waste burden upon states and municipalities, that utility poles represent major sources of health and safety threats, and that reducing the use of wood and wood products, including over 100 million utility poles that are permeated with wood preservatives, would be environmentally beneficial, the manufacture of cost effective construction materials from recycled waste tires, for example, shock-absorbing poles, guardrails, and barriers, could solve enormous solid waste disposal problems while simultaneously addressing environmental and public health and safety concerns.

In addition to the Applicant, others have appreciated the need to utilize waste tires for increasing environmental health. U.S. Pat. No. 5,246,754 (Miller) discloses a construction pole formed from discarded waste tires. Miller's construction poles are formed by 1.) cutting waste tires such that they may be flattened, and 2.) by rolling and gluing the flattened tires upon one another to eventually form a pole. While Miller's methods ultimately form a pole made from waste tires, his methods of cutting the tires in order to flatten them out causes waste and does not incorporate the whole discarded tire into the pole. Additionally, substantial amounts of potentially environmentally toxic glues must be used to secure the tires to one another. Finally, the utility pole disclosed by Miller does not comprise any additional means, other than glue, for providing stability to the structure.

Accordingly, there is a long felt need for utility poles and other construction materials constructed from discarded tires that utilizes the whole tire in its construction, does not use toxic preservatives and potentially toxic glues as a component of its construction, and which is structurally stable yet flexible in applications where desired, and aesthetically appealing.

SUMMARY OF THE INVENTION

The present invention broadly comprises a construction material comprising a plurality of flexible strips, the strips are helically wound upon one another to form a substantially cylindrical tire pole, which may have a circular, square, rectangular, etc. cross-sectional shape. The tire pole includes means for securing the flexible strips to one another. The construction material is generally constructed from discarded tires and may comprise a utility pole, a guardrail, a signpost and may be suitable for many other construction applications.

A general object of the present invention is to utilize waste tires such that they reduce the solid waste disposal burden.

Another object of the present invention is to provide a construction material formed from recycled materials.

A further object of the invention is to provide a construction material formed from waste tires.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

It should be appreciated at the outset that, in the detailed description that follows, like reference numbers on different drawing views are intended to identify identical structural elements of the invention in the respective views. Additionally, it should also be appreciated that the particular embodiments disclosed herein, infra, are presented solely for purposes of illustration; in no way is the scope of the present invention limited to the particular embodiments disclosed herein. Indeed, while a utility pole is described in the following detailed disclosure, it should be appreciated by those having ordinary skill in the art that the construction material of the present invention may be utilized for other purposes; for example the construction material may be formed to serve as a signpost, guardrail, landscaping, or other device. As used herein, the terms "cylinder", "cylindrical" and the like, as they are used to refer to the shape or appearance of a mandrel or tire pole according to the present invention, are intended to connote that a mandrel or tire pole of the present invention comprises a longitudinally disposed central axis. In other words, while a "cylindrical" tire pole according to the present invention may comprise a circular cross-sectional shape, a "cylindrical" tire pole according to the present invention may also comprise other cross-sectional shapes, for example, a tire pole according to the invention may comprise a square, rectangular, triangular, oval, arcuate, polygonal cylinder or combinations thereof.

Figure 1:
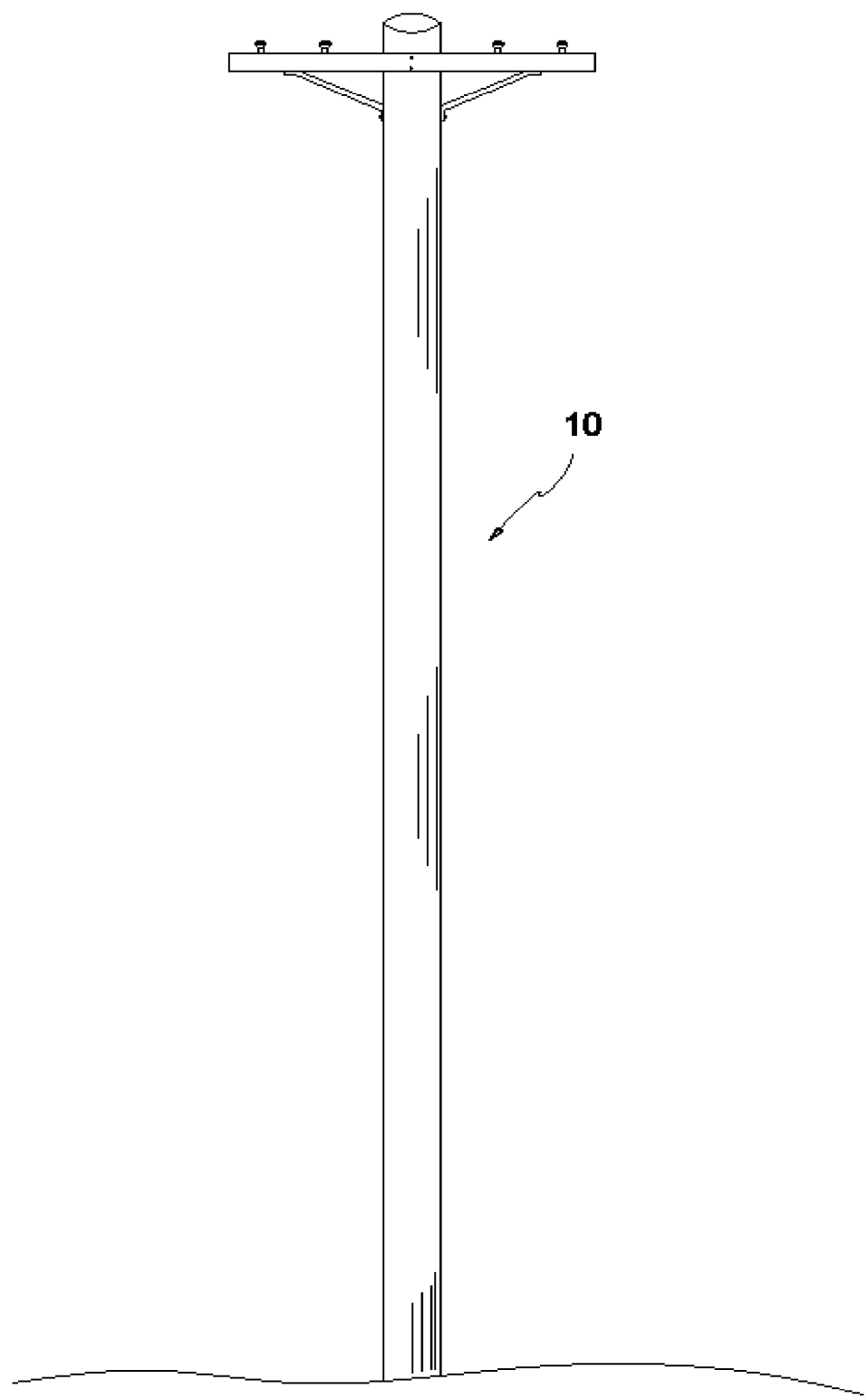
FIG. 1 is a view of a tire pole in accordance with the present invention.
Figure 7:
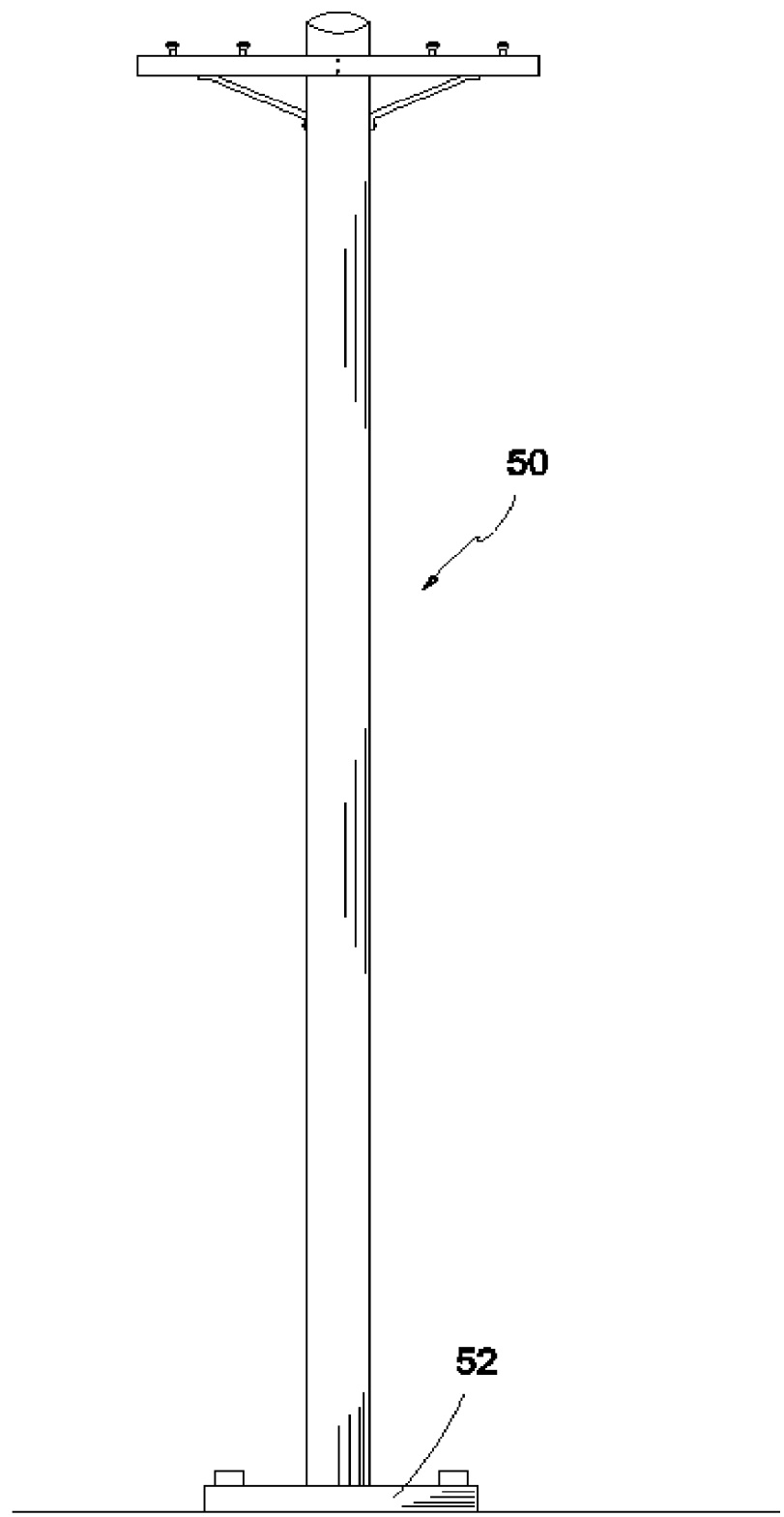
FIG. 7 is an illustration of a method for securing a tire pole of the present invention.

Adverting now to the Figures, FIGS. 1 and 7 illustrate tire pole 10 constructed from discarded tires. As can be seen, the tire pole of the present invention appears similar to a conventional utility pole and may be operatively arranged for securing power, telephone, cable, and like lines. While not apparent from FIG. 1, tire pole 10 is subject to many environmental hazards such as high and low temperatures, rain, snow, sleet, high winds, mold, mildew, fungus, animals and automobiles. However, unlike conventional wooden utility poles, the tire pole of the present invention does not comprise a concoction of harsh and toxic chemicals as discussed supra.

Figure 2:
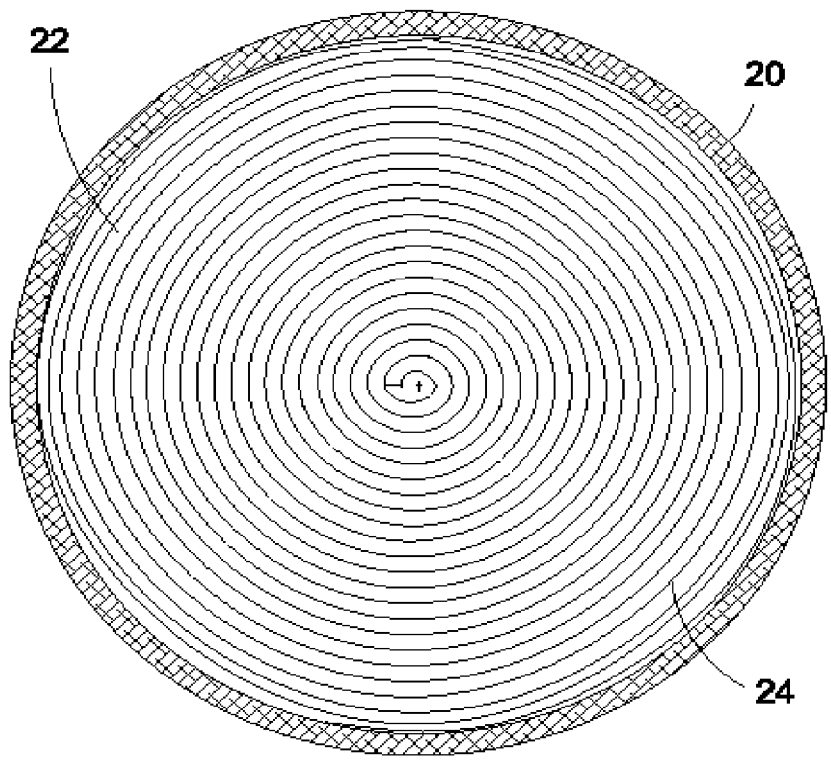
FIG. 2 is a cross sectional view of a tire pole of the present invention.
Figure 3:
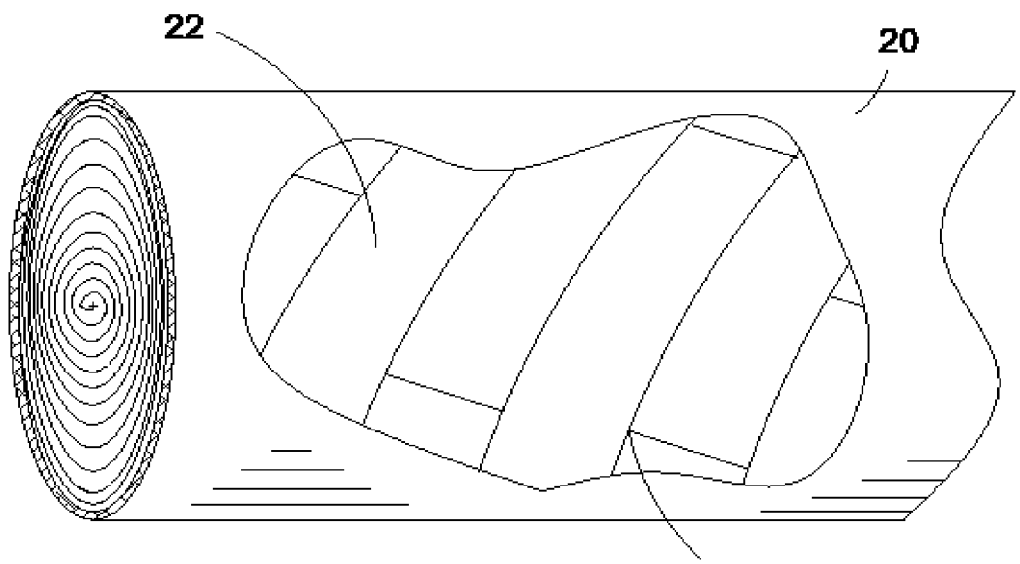
FIG. 3 is a side, cutaway view showing the construction of the tire pole of the present invention.
Figure 4:
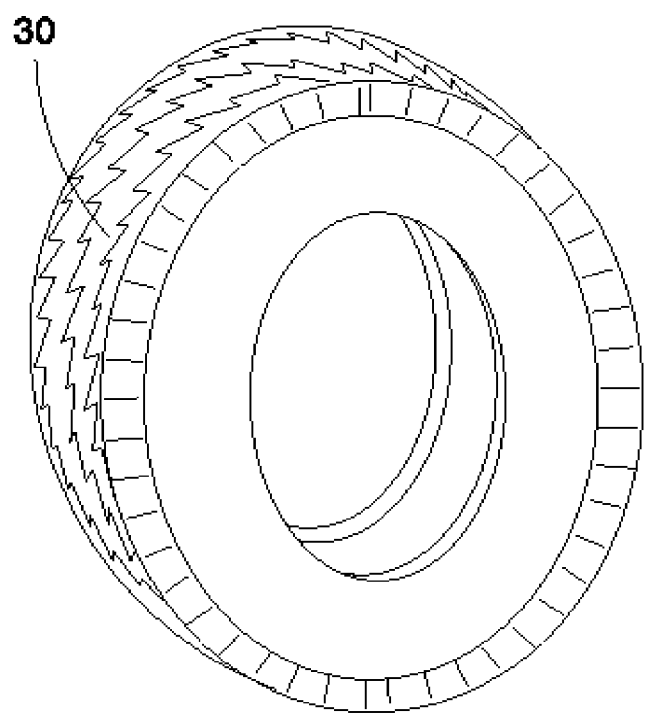
FIG. 4 is an illustration of a typical waste tire.
Figure 5:
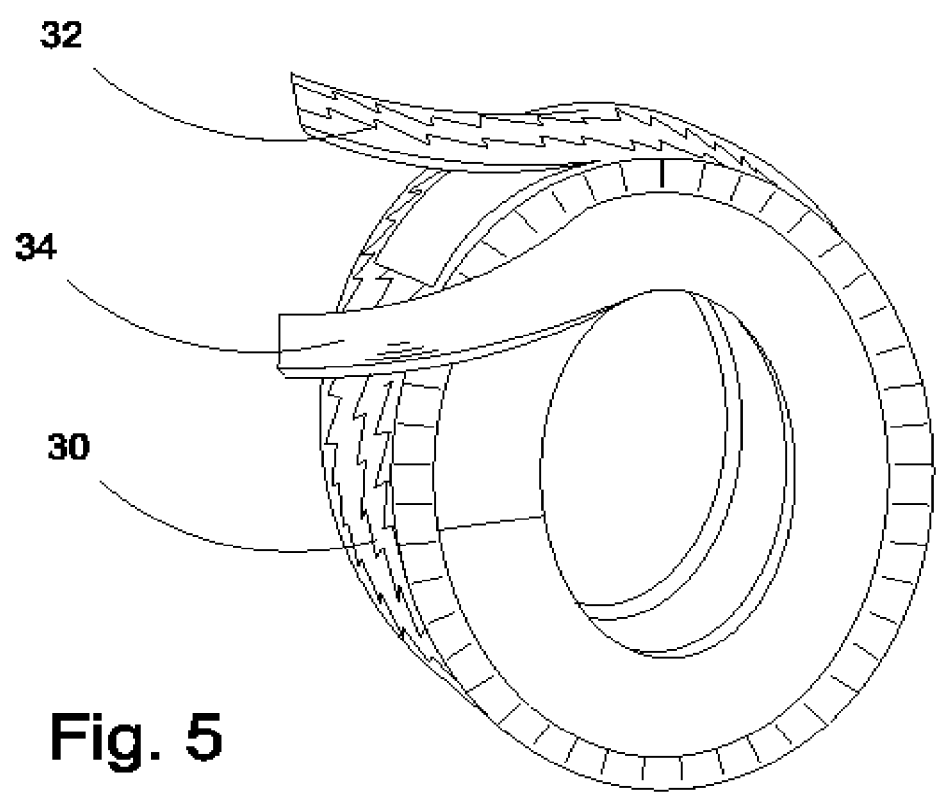
FIG. 5 is an illustration of the method of cutting a waste tire for purposes of preparing construction materials to form the tire pole of the present invention.
Figure 8:
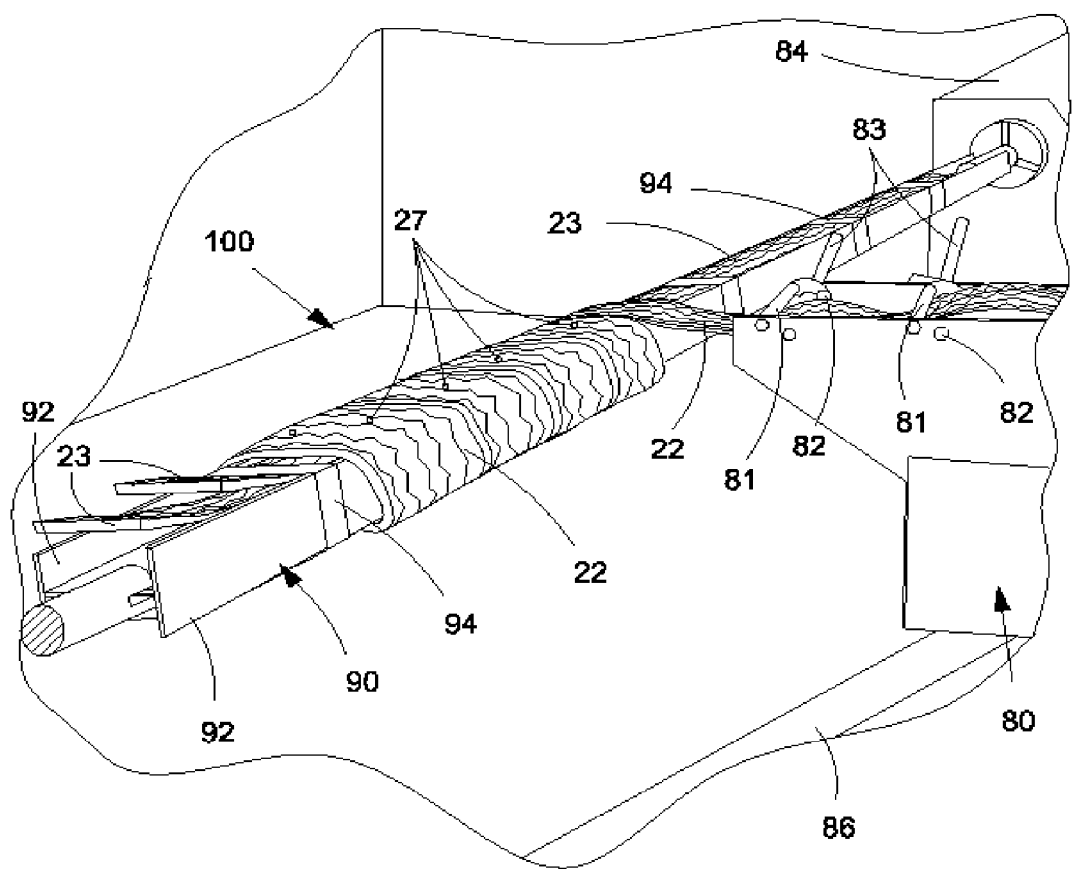
FIG. 8 is an illustration of means and methods for helically winding tire strips to form a construction material according to the present invention.

Referring now to FIGS. 2–6 and 8–12, a tire pole according to the present invention may be constructed in the following manner: as shown more clearly in FIGS. 4 and 5, discarded tires 30 may first be disassembled by removing the sidewalls 34 from tread 32. The tread and sidewalls 30 may then be cut crosswise so that the sidewall and tread components can be laid out in flat strips. Flat strips 22 (shown in FIGS. 3, 6 and 8) may then fed into an industrial winding machine, that may be hand or machine operated, to helically wind strips 22 to form a tire pole. As shown in FIG. 8, which illustrates the fabrication of a tire pole comprising a mandrel in the form of an I-beam, winding machine 80 for helically winding flat strips 22 may be configured to comprise a plurality of tensioning rollers 81 and 82, which press against and feed strips 22 onto the mandrel, which may be rotated by means of lathe 84, or like device. Tensioning rollers 81 and 82 assert a tensioning force upon the strips 22 such that the strips may be wound tightly around the mandrel. The tensioning force applied during winding may be adjusted by means of tensioning handles 83, which alter the angle/configuration of tensioning rollers 81 and 82. Winding machine 80 may be further adapted to move along slide/rail 86 and may be adapted to pivot vertically, horizontally, or as may be required to effectively accomplish the winding process. Winding may also be performed manually, but may not be as effective. Unraveling of the strips may be further prevented by the application of an appropriate adhesive to the underside of the strips being laid down during the winding process, preferably after the strips have passed the tensioning rollers, or may be applied to that portion of the tire pole already wound. Unraveling may also be prevented by fastening the strips by means of nails 27, staples, rivets, or the like. As shown in FIGS. 2, 3, and 8 the winding machine helically winds the strips upon one another to form a tire pole of desired diameter.

Figure 6:
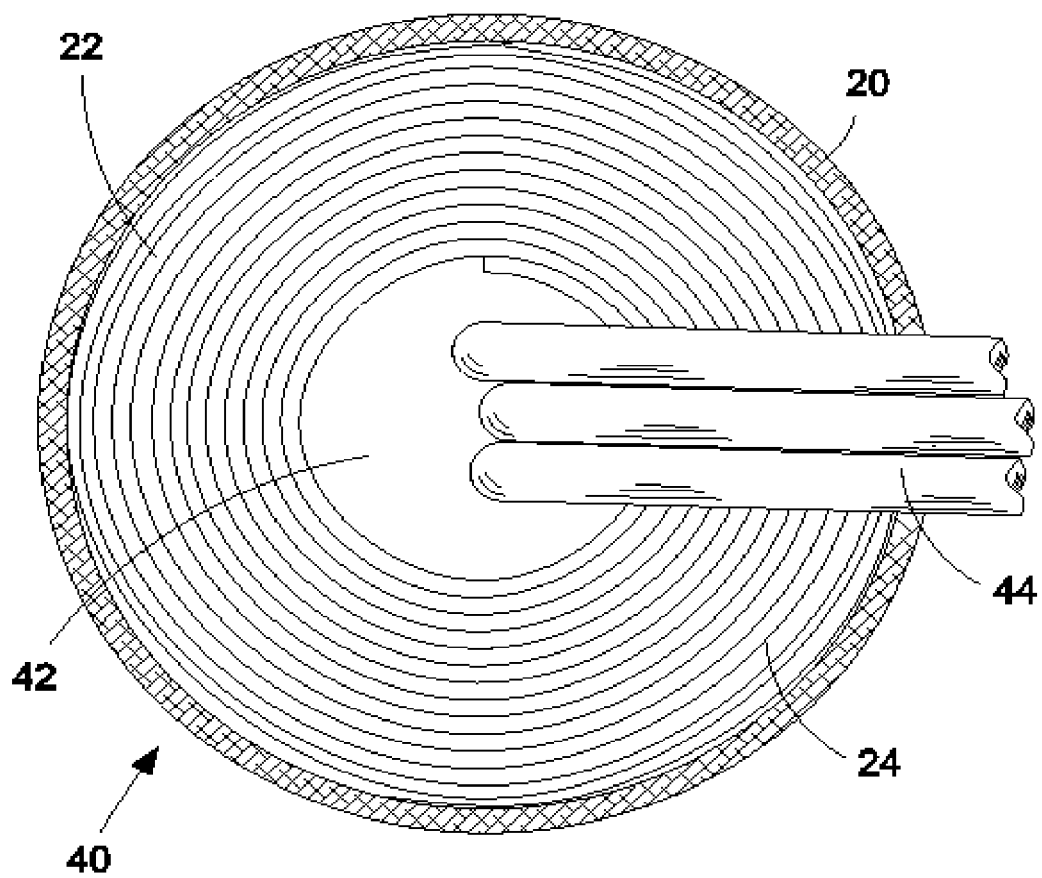
FIG. 6 is a cross sectional view of an embodiment of the present invention comprising a hollow core.

As illustrated in FIGS. 9–14, strips 22 may be wound about a mandrel having a circular, square, rectangular, or other shape, if desired. The mandrel may be solid, hollow, or adapted for later removal from the core of the formed tire pole (see FIG. 6). The mandrel may be constructed from a wide range of materials, which may be dependent upon desired use of the tire pole. For example, if the tire pole were used as a utility pole, the mandrel could be hollow along its length for passing utility wires 44 and the like (see FIG. 6) therethrough. Similarly, where the tire pole is used as a guardrail, one may consider a hollow mandrel comprising additional shock absorbing materials. As shown in FIG. 6, the tire pole comprises hollow core 42 for passing utility wires 44.

During the winding process, layers 24 can be bonded and/or mechanically fastened to one another by means of epoxy resins, polymers, nails, screws, rivets or the like, or combinations thereof. As illustrated in FIGS. 9–14, upon completion of the winding and bonding process and achieving a desired diameter tire pole, metal or other rigid, tubes 25 and or hollowed rivets, may be inserted through the diameter of the tire pole at various desired intervals. Tubes 25 may comprise flared ends 29 that can be bent about the tire pole to secure the tube therein and/or be secured therein by washers. The flared hollow tubes further serve to bind the layers of wound tire strips together and may also act as sleeves for passing bolts 31 or anchoring means 33 therethrough. Thus, tubes 25 may serve as means for anchoring the tire pole, for example, to substrate 35, to another tire pole, or a guardrail support, etc. As shown in FIG. 7, tire pole may be adapted to further comprise base member 52 (shown in FIG. 7), which may be secured to the tire pole via a hollowed mandrel and/or one or more tubes 25 a passing fastening means therethrough, e.g. bolt 31.

Upon completion of tire pole winding, the tire pole may then be cut to an appropriate length and may be encased in a suitable encasing material 20, such as a polymeric resin, thermoplastic coated material, fiberglass or the like; such encasing may add rigidity, uniformity and/or aesthetic appeal to each tire pole.

Figure 9:
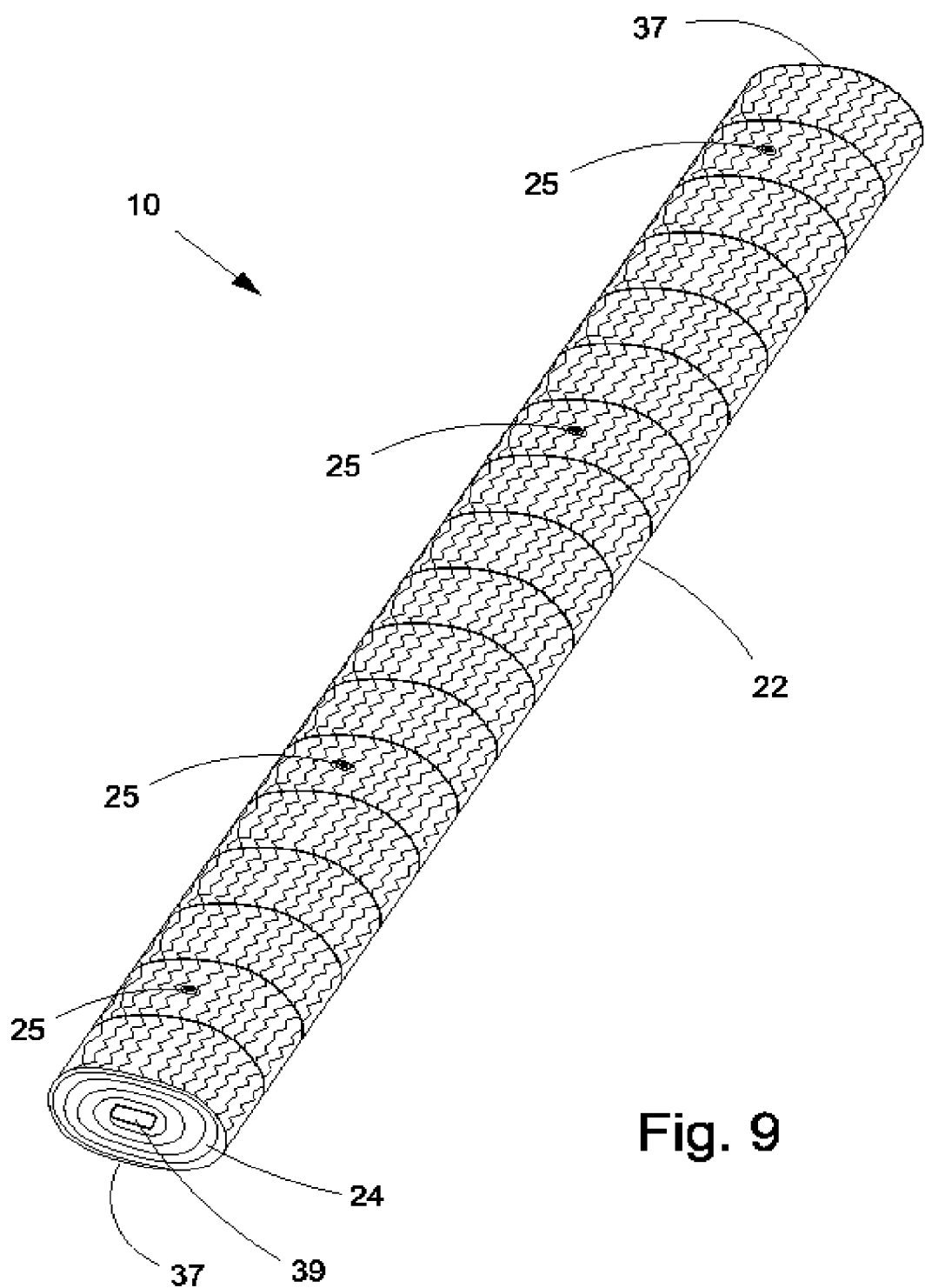
FIG. 9 is a perspective view of an alternative embodiment of the present invention.
Figure 10:
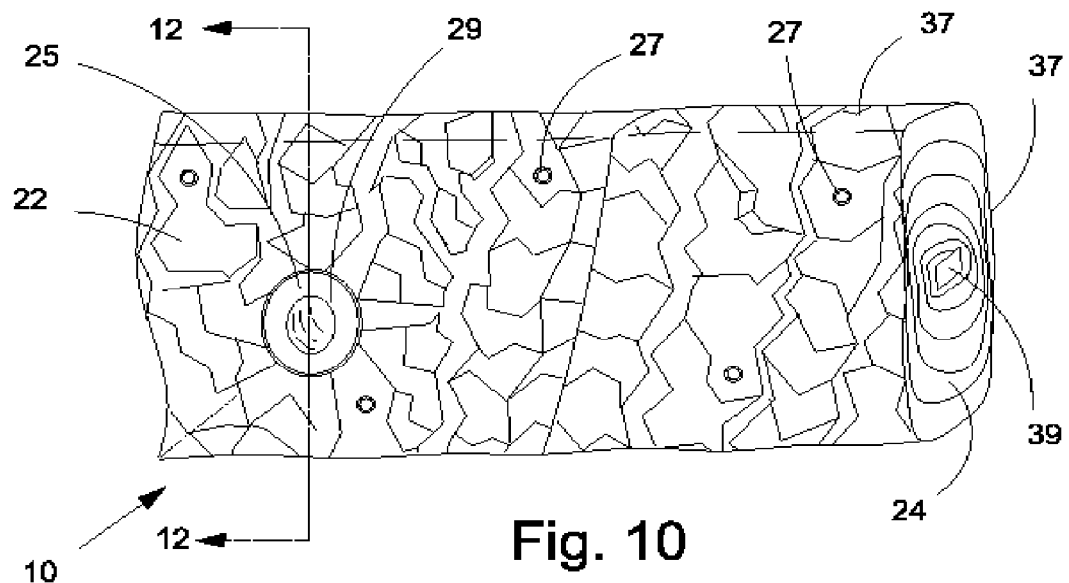
FIG. 10 is a close up view of an embodiment of the present invention illustrating means for securing the invention.
Figure 11:
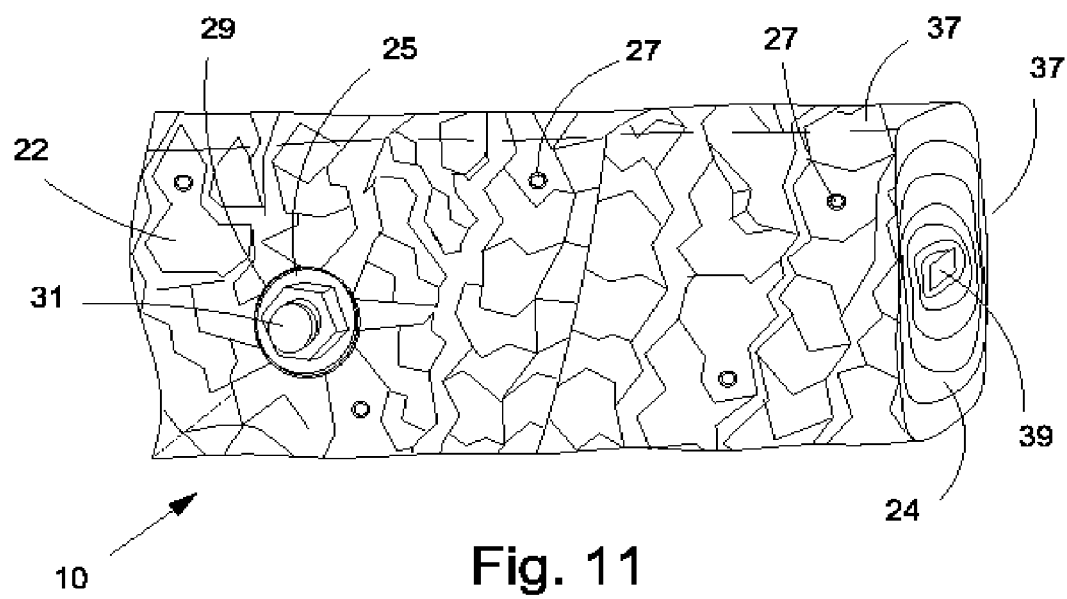
FIG. 11 is a close up view of the embodiment of FIG. 10 further illustrating means for securing the invention.
Figure 12:
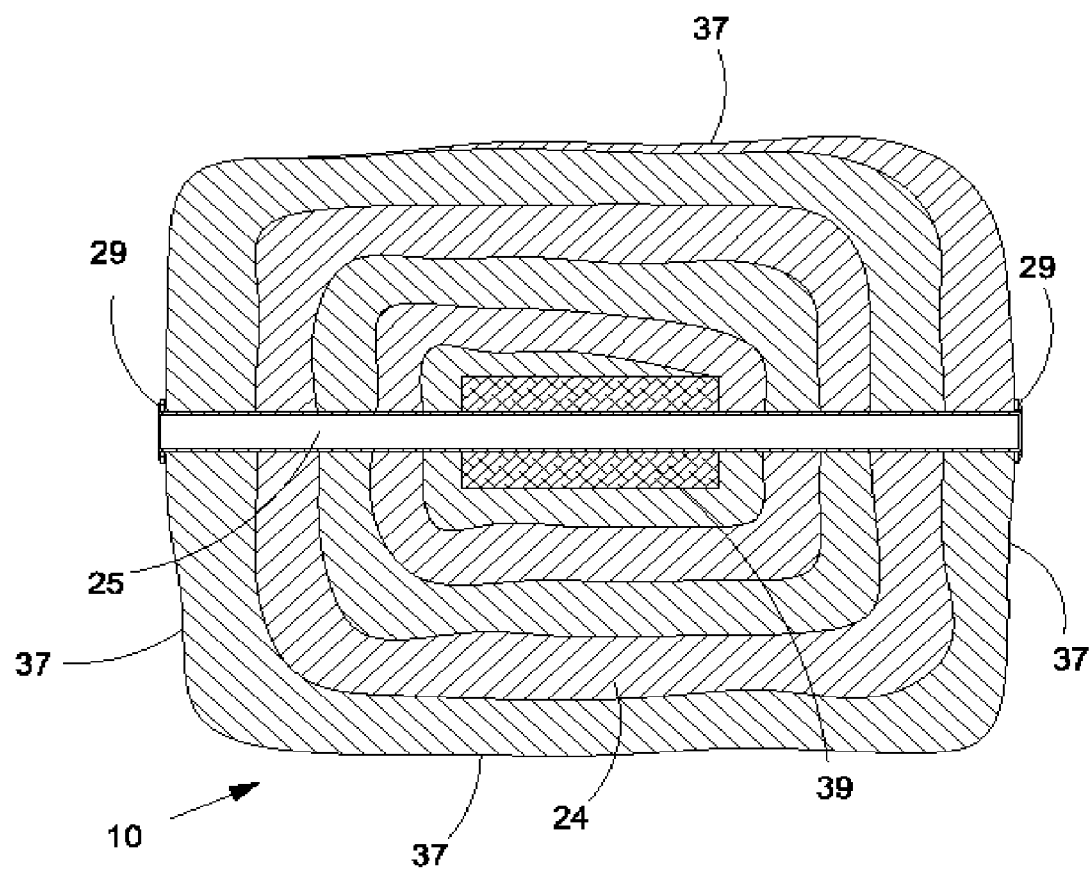
FIG. 12 is a cross-sectional view taken generally along line 13—13 of FIG. 10.
Figure 13:
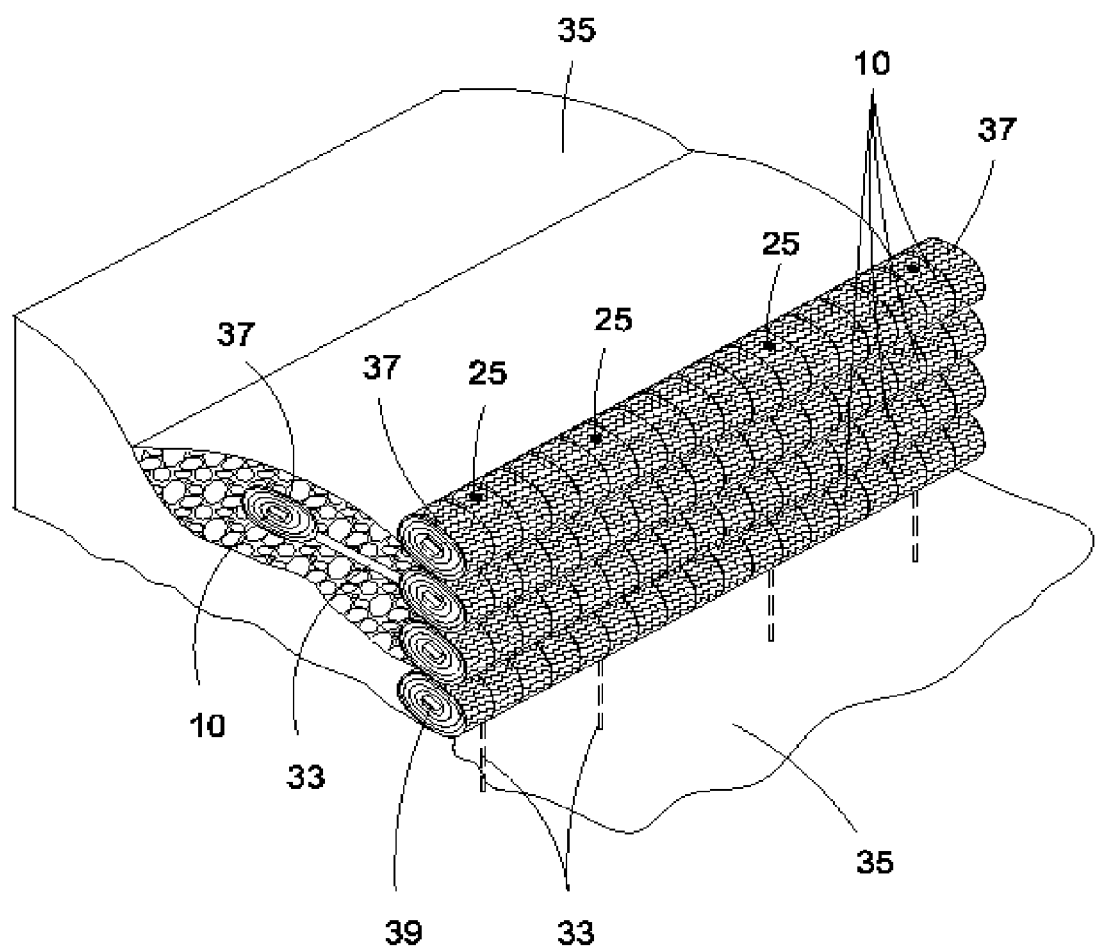
FIG. 13 is a perspective view of a retaining wall formed utilizing a plurality of tire poles according to the present invention.
Figure 14:
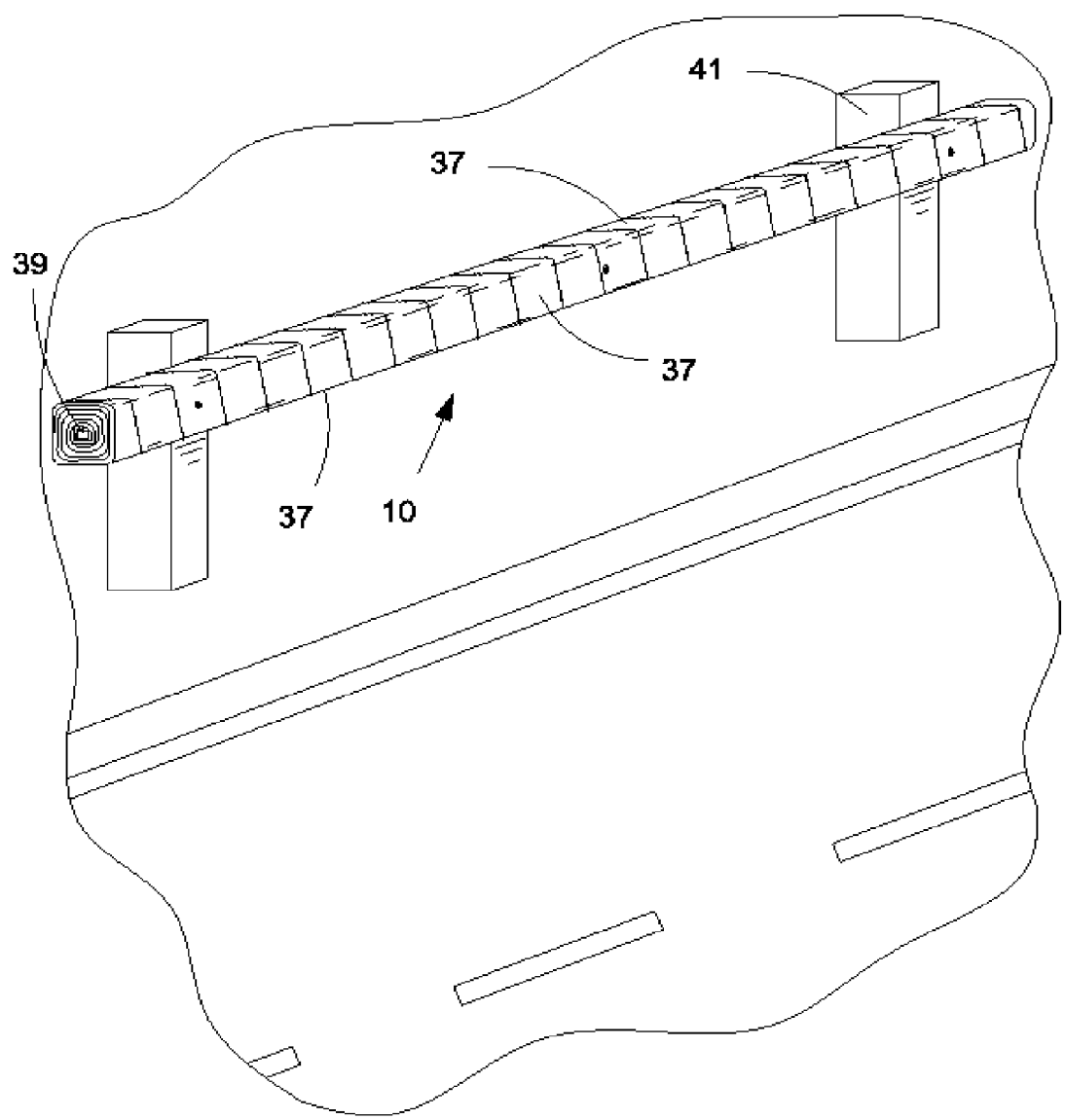
FIG. 14 is an illustration of an embodiment of the present invention configured for use as a guardrail.

As illustrated in FIGS. 9–14, tire pole 10 may be configured to comprise a variety of shapes and serve a wide range of uses. In a preferred embodiment, however, the tire pole of the present invention is configured to comprise substantially flat surface 37, such that one tire pole may more easily be stacked upon another and/or be secured to a substrate. In such embodiment, tire pole 10 comprises mandrel 39 which may be rectangular in shape and/or which has a flat surface of appropriate width. As illustrated in FIGS. 9 and 13, tire pole 10 has a substantially rectangular cross-sectional shape and has a pair of substantially flat surfaces 37. The flat surfaces of the tire pole of FIGS. 9–14 are created by wrapping strips 22 about mandrel 39 which has a flat surface of sufficient size such as a 2×4, 2×6, or other rectangular construction material, about which strips 22 may be wrapped to form a flat surface. It should be appreciated that while other sized mandrels may be used to form a tire pole according to the present invention, because strips 22 may be thick and/or difficult to wrap, a mandrel having sufficient flat surface is preferred in order to form a tire pole comprising a substantially flat surface. As illustrated in FIG. 14, tire pole 10 may be configured to comprise a plurality of flat surfaces. In such embodiment, strips 22 may be wrapped about a square or rectangular mandrel whose sides are of appropriate width to form a tire pole having a plurality of substantially flat sides. Hence, it should be appreciated that, depending upon the desired shape of the finished tire pole, mandrel 39 may comprise virtually any shape, circular, square, rectangular, etc., or combinations thereof.

Figure 15:
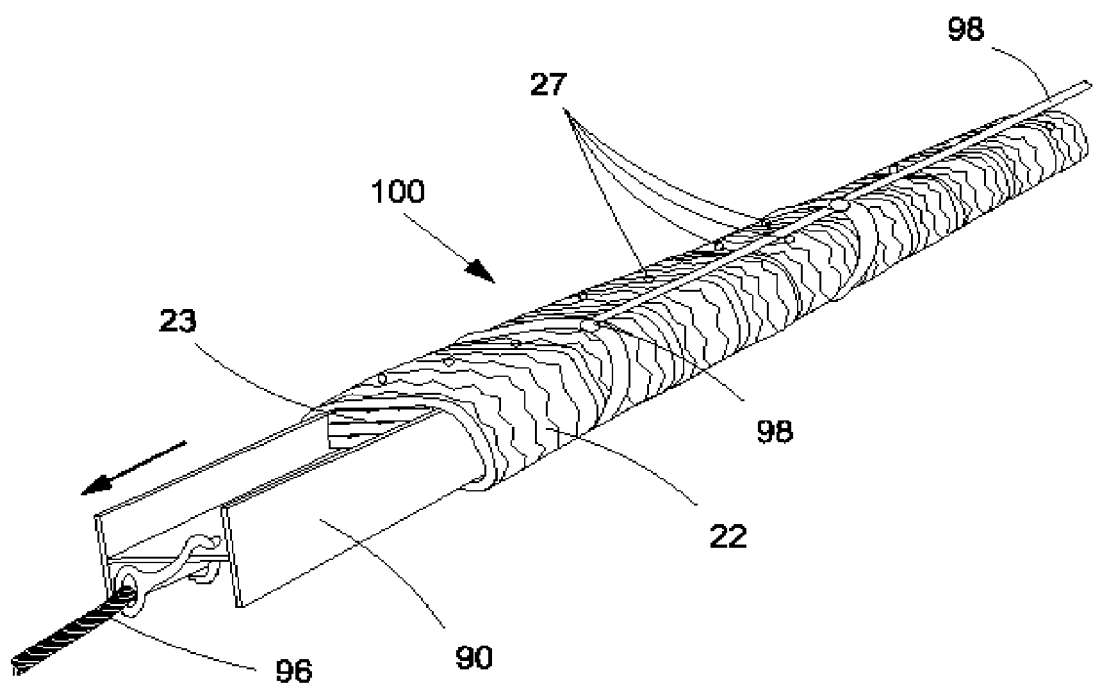
FIG. 15 is an illustration of the removal of the I-beam of FIG. 8.
Figure 16:
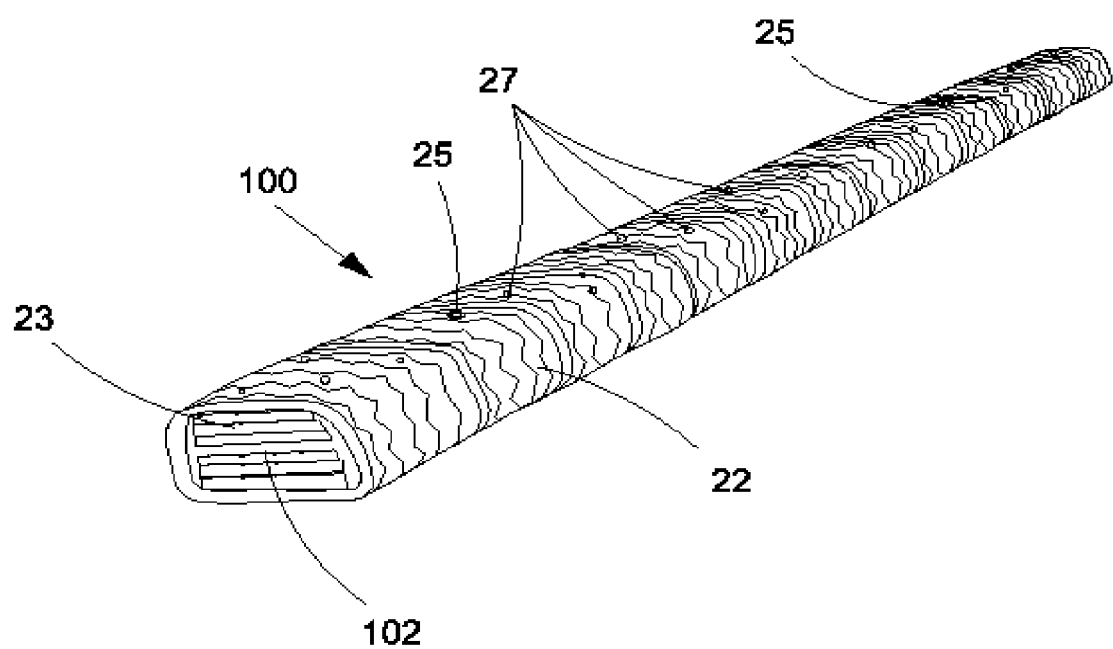
FIG. 16 is an illustration of the embodiment of FIG. 15 wherein the I-beam is removed.

As illustrated in FIGS. 8, 15 and 16, an alternative embodiment of a tire pole according to the present invention may formed from I-beam 90 that may be subsequently removed from the core of the pole to form tire pole 100. In such embodiment, the sides of the I-beam between flanges 92 may be filled with tire strips 23 to form a mandrel having a substantially rectangular cross-sectional shape. Tire strips 23 may be held in between the flanges place by means of tape 94 or the like which wraps about the I-beam. The mandrel formed from the I-beam is then rotated by means of lathe 84 to helically wind tire strips 22 about the mandrel. Tire strips 22 that are helically wound about the mandrel are then fastened to tire strips 23 disposed between flanges 92. Means for securing the helically wound tire strips 22 to tire strips 23 disposed along the sides of the mandrel include, but are not limited to: nails, staples, screws, glues etc. As illustrated more clearly in FIGS. 15 and 16, when winding of tire strips 22 about the I-beam mandrel is completed, I-beam 90 may be removed from the tire pole by means of cable 96, and strap 98. One end of cable 96 may be secured to I-beam 90 by means of a hook or like device and the other end of cable 96 may be connected to a winch or other pulling device. Strap 98 may be secured about the outside of tire pole 100 so as to prevent movement of tire pole 100 when a pulling force (in the direction of the arrow of FIG. 15) is applied to the I-beam. Because tire strips 23 are secured to the helically wound tire strips 22 of the tire pole, tire strips 23 remain within the core of the tire pole. Removal of I-beam 90 also leaves void 102 in the core of tire pole 100. The void is approximately equal to the thickness of the I-beam and is typically about ¼ inches. The void may be closed by the subsequent application of tubes 25, bolts, rivets, etc., as discussed supra. It is also possible to insert cables, piping, wires, or other structures along the length of the tire pole by placing such structures along the sides of the I-beam before the winding process is commenced, or by pulling such structures through the tire pole as the I-beam is removed. It should be appreciated by those having skill in the art that upon removal of the I-beam mandrel, the tire pole retains it's rectangular cross-sectional shape.

As illustrated in FIGS. 13 and 14, tires pole 10 and 100, preferably comprising one or more flat sides, may be utilized for a variety of purposes. For example, FIG. 13 illustrates a plurality of tire poles secured to one another and to a substrate to form a retaining wall to hold earth in place and/or a break wall for preventing damage resulting from wave action. As may be seen from FIG. 13, such retaining/breakwall may be formed from a plurality of tire poles comprising flat surfaces 37, which tire poles 10 and 100 may be stacked upon one another and secured to one another by anchor means 33, or rods, which may pass through hollow tubes 25. Other anchor means 33, in association with additional tire poles 10 and/or 100, may be secured to the sides of the formed wall so as to secure the formed wall to the side of a hill and/or shoreline. FIG. 14 illustrates that a tire pole according to the present invention may be utilized as a traffic safety device, in this case, a guardrail. In such embodiment, flat surface 37 of tire pole may be affixed to a guardrail support 41 by means of hollow tubes 25 and bolts, if desired. It should be appreciated that while a tire pole comprising a substantially square cross-section is illustrated in FIGS. 14 and 16, other shaped tire poles may be utilized. For example, a tire pole for a guardrail could comprise an inner flat surface, which may be secured to guardrail support 41 and a hemispherical outer surface.

Finally, it should be appreciated that other uses of the tire pole(s) of the present invention are contemplated herein. Some uses include, but are not limited to: landscaping, erosion, and flood control applications. The tire pole can be used for embankment stabilization and as a retaining wall construction material that is able to contour to the natural shape of terrain. Due to its extreme strength, resistance to decay, chemical inertness, and lack of toxins, the tire pole is well suited for use in any terrestrial, marine or fresh water environment. The tire pole's flexibility and energy absorbing characteristics make it ideal for applications such as sea walls and bulkheads that are subject to undermining and wave action that may cause other currently used materials, such as concrete and lumber, to buckle thereby losing their structural integrity and escalating their decomposition. The tire pole can also be utilized as an extremely effective toe protection for sea walls, bulkheads, revetments, groins, and breakwaters. By attaching the tire poles together with corrosion resistant cable, a flexible mat of tire poles can be attached to the lower portion of any of these structures. The mat may flex and conform to the ever-changing bottom conditions, and depending on the particular bottom conditions, may actually bury itself in the bottom surface (sand) and provide excellent toe protection from the effects of undermining. In addition to the above-identified uses, the tire pole of the present invention may be used for other applications. For example, boat ramps, guardrail posts, crash and soundproofing barriers and signposts. Indeed, the tire pole may be utilized to upgrade the traditional "W" style guardrail by attaching the tire pole to an existing rail thereby adding the strength and energy absorbing qualities of the tire pole to the existing rail and bringing it up to the more stringent federal specifications currently being implemented by the Federal Highway Administration.

Thus, it is seen that the objects of the present invention are efficiently obtained, although modifications and changes to the invention should be readily apparent to those having ordinary skill in the art, which modifications are intended to be within the spirit and scope of the invention as claimed.

The invention claimed is:

1. A construction material comprising:
   a plurality of flexible strips, said strips helically wound upon one another to form a cylindrical pole;
   securing means for securing said strips to one another;
   at least one transverse hole disposed through said construction material; and,
   at least one hollow tube disposed through at least one of said at least one transverse holes;
   wherein said at least one hollow tube comprises flared ends bent about said plurality of flexible strips and functions to bind said plurality of flexible strips.

2. The construction material of claim 1 further comprising encasing means for encasing said pole.

3. The construction material of claim 1 wherein said flexible strips are rubber.

4. The construction material of claim 3 wherein said flexible strips correspond to sidewalls and treads of a tire and are cut therefrom.

5. The construction material of claim 1 wherein said securing means comprises polymer resin.

6. The construction material of claim 1 wherein said securing means is a fastener.

7. The construction material of claim 6 wherein said fastener is selected from the group consisting of nails, screws and staples.

8. The construction material of claim 1 further comprising a central longitudinally disposed mandrel upon which said flexible layers are helically wound.

9. The construction material of claim 8 wherein said mandrel is hollow.

10. The construction material of claim 8 wherein said mandrel is operatively arranged for removal.

11. The construction material of claim 1 wherein said at least one hollow tube is disposed through a diameter of said cylindrical pole.

12. The construction material of claim 1 comprising a utility pole.

13. The construction material of claim 1 adapted to form a guardrail.

14. The construction material of claim 1 wherein a nut and bolt assembly is passed through at least one of said at least one hollow tubes.

15. A method of producing a pole comprising:
   cutting the sidewalls and treads from a tire to form separate flat strips;
   helically winding said strips upon one another and securing said strips to one another to form a cylindrical pole of desired diameter;
   creating at least one transverse hole through said cylindrical pole;
   encasing said cylindrical pole; and,
   passing at least one hollow tube through at least one of said at least one transverse holes, wherein said at least one hollow tube includes flared ends bent about the wound strips and binding said helically wound strips.

16. A construction material comprising:
   a plurality of flexible strips formed from the tread and side wall portions of a tire, said flexible strips wound about a mandrel and upon one another to form said construction material; and,
   means for securing said flexible strips to one another, said construction material having at least one planar side disposed along its length;
   at least one transverse hole disposed therethrough; and,
   at least one hollow tube disposed through at least one of said at least one transverse hole,
   wherein said at least one hollow tube comprises flared ends bent about said plurality of flexible strips and functions to bind said plurality of flexible strips.

17. The construction material of claim 16 wherein a nut and bolt assembly is passed through at least one of said at least one hollow tube.

* * * * *